UNITED STATES PATENT OFFICE.

GUSTAV EBERT, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF MAKING PHENYLETHYLMETHYLPYRAZOLONE.

SPECIFICATION forming part of Letters Patent No. 464,861, dated December 8, 1891.

Application filed October 27, 1890. Serial No. 369,499. (Specimens.)

*To all whom it may concern:*

Be it known that I, GUSTAV EBERT, doctor of philosophy, a citizen of the Empire of Germany, residing at Höchst-on-the-Main, in the Empire of Germany, have invented certain new and useful Improvements in the Production of Phenylethylmethylpyrazolone; and I do hereby declare the following to be a full, clear, and exact description of the invention, such as will enable others skilled in the art to which it appertains to make and use the same.

My invention relates to the production of the phenylethylmethylpyrazolone.

In carrying out my invention I proceed as follows: Equal parts of phenylmethylpyrazolone and iodethyl in an enameled autoclave are heated under pressure to 150° centigrade for twelve hours. The product of the reaction presents itself in crystalline form. The excess of iodethyl is driven off, the free iodine taken up by some sulphurous acid, and then the reaction product decomposed by means of warm soda-lye of 40° Baumé. The oil which separates is taken up by benzine, ($C_6H_6$.) This benzine ($C_6H_6$) solution is dried by means of caustic potash, filtered; and a current of dry hydrochloric-acid gas caused to flow into it. The hydrochloride of the base precipitates in the form of a crystalline powder of nearly white color. Instead of introducing hydrochloric-acid gas into the reaction product, the benzine ($C_6H_6$) may be expelled and the oil remaining be mixed with concentrated hydrochloric acid. In this case the phenylethylmethylpyrazolone will separate in crystalline form, any impurities remaining in the mother-liquor. The salt is dissolved in a small quantity of alcohol (a very small part remaining undissolved) and poured into a large quantity of ether. The separated product presents itself at first as an oil, but very soon assumes crystalline form. It is filtered and dried. Melting-point 151° centigrade. According to analysis its formula is $C_{12}H_{14}N_2O$, ClH. It is of very easy solubility in water, alcohol, and in chloroform; but scarcely soluble in ether. In order to set free the base, the salt is dissolved in water and mixed with a large quantity of soda-lye. The oil thus obtained is taken up in benzine, ($C_6H_6$,) the benzine ($C_6H_6$) solution heated with caustic potash, and finally the benzine ($C_6H_6$) distilled off. The base remains behind in the form of an oil, which, when dried in the exsiccator or the air-pump, quickly sets in crystalline form. The phenylethylmethylpyrazolone is of unusual easy solubility in water, alcohol, benzine, ($C_6H_6$,) ether, and chloroform, insoluble or scarcely soluble in ligroine. Left exposed to the air it becomes deliquescent. Melting-point between 71° and 72½° centigrade.

By the addition of nitrite of sodium and acetic acid to its aqueous solution is formed a green scarcely-soluble nitroso compound. When to the base dissolved in alcohol there is added an alcoholic solution of ferric chloride, the red double salt (three molecules of base and two molecules of $FeCl_3$) precipitates.

The article claimed in this application is a homologue of antipyrine and, like antipyrine itself, may be used as a medicine.

What I claim as my invention, and desire to secure by Letters Patent, is—

1. The process of making phenylethylmethylpyrazolone by heating phenylmethylpyrazolone with iodethyl, then driving off the excess of iodethyl, taking up the free iodine by sulphurous acid, and decomposing the product of the reaction by soda-lye, now taking up the oil by benzine, treating with hydrochloric acid, dissolving the hydrochlorate in alcohol, and pouring it into ether, filtering and drying the product, dissolving it again in water, adding soda-lye, taking up the oil in benzine, distilling off the latter, and drying the oil remaining back in an exsiccator or by an air-pump, all substantially as described.

2. As a new article of manufacture, phenylethylmethylpyrazolone derived from phenylmethylpyrazolone, which is very soluble in water, alcohol, benzine, ether, and chloroform, insoluble or scarcely soluble in ligroine, deliquescent on being left exposed to the air, melting at between 71° and 72½° centigrade, having a formula, by analysis, of $C_{12}H_{14}N_2O$, forming with nitrite of sodium and acetic acid a green scarcely-soluble nitroso compound, and with ferric chloride a red double salt containing three molecules of the base and two molecules of $FeCl_3$.

In testimony whereof I affix my signature in presence of two witnesses.

GUSTAV EBERT.

Witnesses:
 JOSEF REVERDY,
 HEINRICH HAHN.